United States Patent
Eisner et al.

(10) Patent No.: US 10,036,819 B2
(45) Date of Patent: Jul. 31, 2018

(54) METHOD OF USING SEMBLANCE OF CORRECTED AMPLITUDES DUE TO SOURCE MECHANISMS FOR MICROSEISMIC EVENT DETECTION AND LOCATION

(71) Applicant: Microseismic, Inc., Houston, TX (US)

(72) Inventors: Leo Eisner, Prague (CZ); Frantisek Stanek, Plzen (CZ); Jan Valenta, Prague (CZ)

(73) Assignee: Microseismic, Inc., Houston, TX (US)

( * ) Notice: Subject to any disclaimer, the term of this patent is extended or adjusted under 35 U.S.C. 154(b) by 114 days.

(21) Appl. No.: 15/128,195

(22) PCT Filed: Apr. 17, 2015

(86) PCT No.: PCT/US2015/026269
§ 371 (c)(1),
(2) Date: Sep. 22, 2016

(87) PCT Pub. No.: WO2015/167818
PCT Pub. Date: Nov. 5, 2015

(65) Prior Publication Data
US 2017/0097430 A1  Apr. 6, 2017

Related U.S. Application Data

(60) Provisional application No. 61/984,907, filed on Apr. 28, 2014.

(51) Int. Cl.
*G01V 1/28* (2006.01)

(52) U.S. Cl.
CPC ........ *G01V 1/288* (2013.01); *G01V 2210/123* (2013.01); *G01V 2210/1234* (2013.01); *G01V 2210/65* (2013.01)

(58) Field of Classification Search
CPC . G01V 1/28; G01V 1/288; G01V 1/30; G01V 2210/123; G01V 2210/1232; G01V 2210/1234
(Continued)

(56) References Cited

U.S. PATENT DOCUMENTS 5,771,170 A * 6/1998 Withers ................ G01V 1/288
702/14
2008/0247269 A1  10/2008 Chen
(Continued)

OTHER PUBLICATIONS

Huang et al., "Locating Microseismicity from Surface Monitoring Arrays Using Grid Search and Hypocenter Inversion", 76th EAGE Conference & Exhibition 2014 Amsterdam RAI, The Netherlands, Jun. 16-19, 2014.*

*Primary Examiner* — Ian J Lobo
(74) *Attorney, Agent, or Firm* — Richard A. Fagin

(57) ABSTRACT

A method for determining hypocenters of microseismic events includes entering as input to a computer seismic signals recorded by a plurality of seismic sensors disposed proximate a volume of subsurface to be evaluated. For each point in space in the volume, and for a plurality of preselected origin times, a seismic energy arrival time at each seismic sensor is determined. Event amplitudes for each arrival time are determined. A synthetic event amplitude is calculated for each arrival time. A semblance between the determined event amplitudes and the synthetic event amplitudes is determined. Existence of an actual microseismic is determined event when the semblance exceeds a selected threshold.

11 Claims, 3 Drawing Sheets

(58) Field of Classification Search
USPC .................................................. 367/38, 59
See application file for complete search history.

(56) References Cited

U.S. PATENT DOCUMENTS

| | | |
|---|---|---|
| 2009/0048783 A1 | 2/2009 | Jechumtalova et al. |
| 2009/0259406 A1 | 10/2009 | Khadhraoui |
| 2010/0302905 A1* | 12/2010 | Meunier ............... G01V 1/366 367/42 |
| 2011/0155389 A1 | 6/2011 | Burtz et al. |
| 2012/0257475 A1 | 10/2012 | Luscombe et al. |
| 2013/0088940 A1* | 4/2013 | De Cacqueray ....... G01V 1/288 367/51 |
| 2013/0100770 A1 | 4/2013 | Diller et al. |
| 2013/0215716 A1 | 8/2013 | Hofland |
| 2013/0265851 A1* | 10/2013 | Faber ...................... G01V 1/42 367/25 |
| 2014/0278120 A1* | 9/2014 | Kahn ..................... G01V 1/288 702/18 |

* cited by examiner

METHOD OF USING SEMBLANCE OF CORRECTED AMPLITUDES DUE TO SOURCE MECHANISMS FOR MICROSEISMIC EVENT DETECTION AND LOCATION

BACKGROUND

This disclosure is related to the field of detection of hypocenters (origin time and position in the subsurface) from passive seismic signals. Passive seismic signals are those detected resulting from microseismic events occurring in the Earth's subsurface, whether the microseismic events are naturally occurring or induced by other activities. More specifically, the disclosure relates to methods for using semblance of corrected amplitudes of passively detected and recorded seismic signals to determine what in the signals are caused by actual microseismic events and to determine the hypocenters of such events.

Passive seismic signal detection and signal processing methods are widely used for microseismic monitoring of hydraulic fracturing. In such uses, large arrays of seismic sensors deployed at the Earth's surface, buried in shallow boreholes or installed in monitoring wells are used to map induced seismicity. The goals of microseismic data processing include event detection, estimation of hypocenter locations, determination of source mechanisms and magnitudes characterizing induced events. These results may then be used for creation of geomechanical models or simple computation of stimulated rock volume representing a response of the reservoir to stimulation. See, Neuhaus, C. W., Blair, K. Telker, C. and Ellison, M. (2013), *Hydrocarbon Production and Microseismic Monitoring—Treatment Optimization in the Marcellus Shale*, 75th EAGE Conference & Exhibition incorporating SPE EUROPEC 2013, SPE-164807-MS, and Hummel, N. and Shapiro, S. (2013). *Nonlinear diffusion-based interpretation of induced microseismicity: A Barnett Shale hydraulic fracturing case study*, Geophysics, 78(5), B211-B226. doi: 10.1190/geo2012-0242.1.

Because the exact origin time of a microseismic event is not known a priori, in passive seismic surveying seismic signals are acquired continuously for a selected time duration and search routines are implemented to detect events in the acquired signals. To do so one may use multichannel processing of large data sets where events are represented by compressional (P) and/or shear (S) wave arrivals in each seismic sensor signal record trace (a time indexed recording of seismic signal amplitude). However, P and S wave arrivals may not be detectable (e.g., by visual observation or threshold amplitude detection) due to a low signal-to-noise ratio (SNR) which makes event detection in unstacked trace gathers difficult. While generally background noise is higher for surface deployed seismic sensor arrays than for arrays deployed in one or more wellbores, lower amplitude arrivals in both surface and borehole arrays can usually compensated by stacking of signals from a large number of seismic sensors covering a wide range of offsets and azimuths, typically then processed with migration techniques (See, Duncan, P. and Eisner, L. (2010), *Reservoir characterization using surface microseismic monitoring*, Geophysics, 75(5), 75A139-75A146. doi: 10.1190/1.3467760). An object of microseismic monitoring techniques is to detect microseismic events, including events that are not readily detectable in unstacked trace gathers.

Migration-based microseismic event detection techniques usually rely on obtaining a high value of a trace sum stack along a moveout curve (a seismic sensor offset dependent time shift for each trace related to the seismic energy velocity distribution in the subsurface) computed from a hypothetical source position, thereby improving the SNR of unstacked traces. See, Duncan and Eisner, 2010, Chambers, K., Kendall, J.-M., Brandsberg-Dahl, S. and Rueda, J. (2010), *Testing the ability of surface arrays to monitor microseismic activity*, Geophysical Prospecting, 58: 821-830. doi: 10.1111/j.1365-2478.2010.00893.x, Gharti, H., Oye, V., Roth, M., and Kühn, D. (2010), *Automated microearthquake location using envelope stacking and robust global optimization*, Geophysics, 75(4), MA27-MA46. doi: 10.1190/1.3432784, and Bradford, I., Probert, T., Raymer, D., Ozbek, A., Primiero, P., Kragh, E., Drew, J. and Woerpel, C. (2013), *Application of Coalescence Microseismic Mapping to Hydraulic Fracture Monitoring Conducted Using a Surface Array*, 75th EAGE Conference & Exhibition incorporating SPE EUROPEC 2013. doi: 10.3997/2214-4609.20131028). However, typical microseismic events do not radiate seismic energy symmetrically as do controlled seismic sources such as dynamite explosions, seismic vibrators and seismic air guns deployed in water. The radiated energy and amplitude polarity of the energy from microseismic events or microearthquakes are strongly directional and have specific signatures due to the specific energy radiation patters of various microseismic source mechanisms. Recorded seismic signal amplitudes from a particular microseismic event may have different polarities and amplitudes at different seismic sensors that differ markedly from what would be anticipated assuming simple symmetrical geometrical spreading of seismic energy from the origin of any microseismic event. Hence, if one simply stacked both positive and negative polarity seismic signals with respect to position or offset one would obtain very low stacked signal amplitude values. The foregoing result may be overcome by stacking the absolute values of signal amplitudes, but at the cost of reducing the SNR of the stacked signal amplitudes. Zhebel, O. and Eisner, L. (2012), *Simultaneous microseismic event localization and source mechanism determination*, SEG Technical Program Expanded Abstracts 2012: pp. 1-5. doi: 10.1190/segam2012-1033.1 and Chambers, K., Clarke, J., Velasco, R. and Dando B. (2013), *Surface Array Moment Tensor Microseismic Imaging*, 75th EAGE Conference & Exhibition incorporating SPE EUROPEC 2013, doi: 10.3997/2214-4609.20130404 describe methods capable of simultaneously determining the origin location and source mechanism of microseismic events. The foregoing methods use a moment tensor inversion of P-wave (or S-wave) amplitudes taken along the moveout direction for every potential origin point in three dimensional (3D) subsurface space and then correct the polarity of detected signal amplitudes using the inverted moment tensor before stacking. Thus, the foregoing methods may obtain the highest stack value for the correct event origin location and source mechanism.

A challenge in using stacking is that only a few, or in extreme cases even one high amplitude noisy trace may result in high stack amplitudes indicating a spurious detection, the so called "false positive." See, Thornton, M. and Eisner, L., "*Uncertainty in surface microseismic monitoring*, SEG Technical Program Expanded Abstracts, 2011: pp. 1524-1528. doi: 10.1190/1.3627492

DETAILED DESCRIPTION

Figure 1:
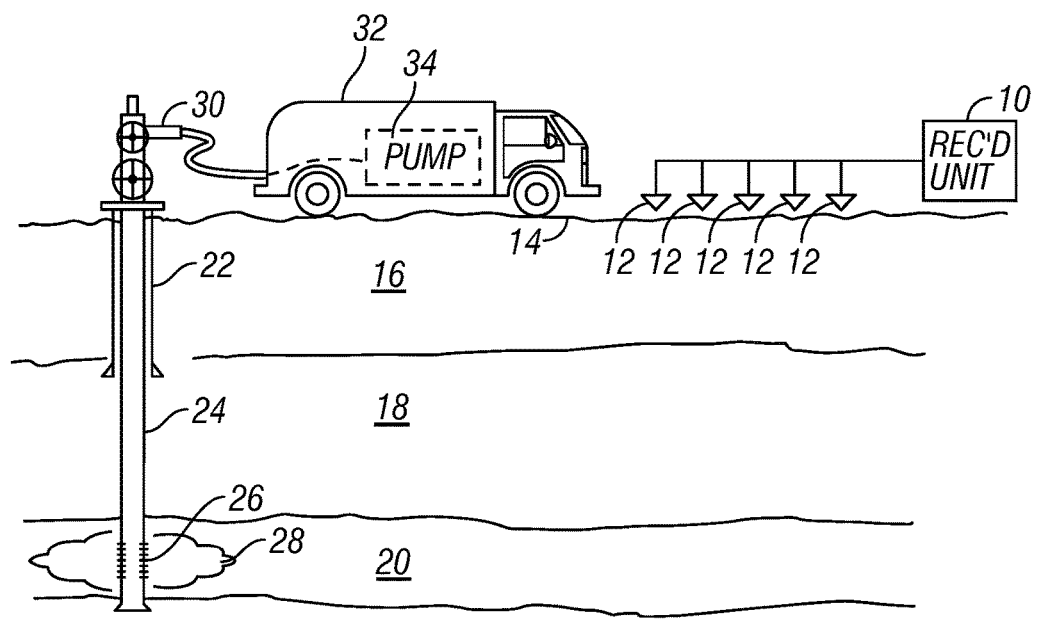
FIG. 1 shows an example of acquisition of passive seismic signals that may be processed according to example embodiments according to the present disclosure.

FIG. 1 shows an example arrangement of seismic sensors as they may be used in one application of a method according to the present disclosure The embodiment illustrated in FIG. 1 is associated with an application for passive seismic emission tomography known as "fracture monitoring." It should be clearly understood that the application illustrated in FIG. 1 is only one possible application of a method according to the present disclosure and that use of methods according to the present disclosure are not limited to use with fracture monitoring.

In the example embodiment of FIG. 1, each of a plurality of seismic sensors, shown generally at 12, is deployed at a selected position proximate the Earth's surface 14. In marine applications, the seismic sensors may be deployed on the water bottom in a device known as an "ocean bottom cable." The seismic sensors 12 in the present embodiment may be geophones, but may also be accelerometers or any other sensing device known in the art that is responsive to velocity, acceleration or motion of the particles of the Earth proximate the seismic sensor. The seismic sensors 12 generate electrical or optical signals in response to the particle motion, velocity or acceleration, and such signals are ultimately coupled to a recording unit 10 for making a time-indexed recording of the signals from each seismic sensor 12 for later interpretation by a method according to the present disclosure. In other implementations, the seismic sensors 12 may be disposed at various positions within one or more wellbores drilled through subsurface formations. A particular advantage of a method according to the present disclosure is that it provides generally useful results when the seismic sensors are disposed at or near the Earth's surface. Surface deployment of seismic sensors is relatively cost and time effective as contrasted with subsurface seismic sensor emplacements needed in methods known in the art prior to the present disclosure.

In some embodiments, the seismic sensors 12 may be arranged in sub-groups having spacing therebetween less than about one-half the expected wavelength of seismic energy from the Earth's subsurface that is intended to be detected. Signals from all the seismic sensors 12 in one or more of the sub-groups may be added or summed to reduce the effects of noise in the detected signals.

In other embodiments, the seismic sensors 12 may be placed in a wellbore, either permanently for certain long-term monitoring applications, or temporarily, such as by wireline conveyance, tubing conveyance or any other sensor conveyance technique known in the art. Irrespective of the manner of deployment or placement of the seismic sensors 12, they may be arranged proximate the expected positions of seismic events occurring within the subsurface. Proximate in the present context means distances of up to about 10 to 15 km from the position of the seismic event to the most distant seismic sensor.

A wellbore 22 is shown drilled through various subsurface Earth formations 16, 18, through a hydrocarbon producing formation 20. A wellbore pipe or tubing 24 having perforations 26 formed therein corresponding to the depth of the hydrocarbon producing formation 20 is connected to a valve set known as a wellhead 30 disposed at the Earth's surface. The wellhead 30 may be hydraulic communication with a pump 34 in a fracture fluid pumping unit 32. The fracture fluid pumping unit 32 is used in the process of pumping a fluid, which in some instances includes selected size solid particles, collectively called "proppant", are disposed. Pumping such fluid, whether propped or otherwise, is known as hydraulic fracturing. The movement of the fluid is shown schematically at a fluid front 28 (the position of the laterally outward most extent of a body of the pumped fluid) in FIG. 1. In hydraulic fracturing techniques known in the art, the fluid is pumped at a pressure which exceeds the fracture pressure of the particular producing formation 20, causing it to rupture, and form fissures therein. The fracture pressure is generally related to the pressure exerted by the weight of all the formations 16, 18 disposed above the hydrocarbon producing formation 20, and such pressure is generally referred to as the "overburden pressure." In propped hydraulic fracturing operations, the particles of the proppant move into such fissures and remain therein after the fluid pressure is reduced below the fracture pressure of the formation 20. The proppant, by appropriate selection of particle size distribution and shape, forms a high permeability channel in the hydrocarbon producing formation 20 that may extend a substantial lateral distance away from the pipe or tubing 24, and such channel remains permeable after the fluid pressure is relieved. The effect of the proppant filled channel is to increase the effective fluid drainage radius of the wellbore 24 that is in hydraulic communication with the producing formation 20, thus substantially increasing productive capacity of the wellbore 24 to fluid, particularly hydrocarbons.

The hydraulic fracturing of the formation 20 by the fluid pressure creates seismic energy that is detected by the seismic sensors 12. The time at which the seismic energy is detected by each of the seismic sensors 12 with respect to the time-dependent position in the subsurface of the formation fracture caused at the fluid front 28 is related to the acoustic velocity of each of the formations 16, 18, 20, and the position of each of the seismic sensors 12.

Having explained one type of passive seismic data that may be used with methods according to the present disclosure, an example method for processing such seismic data will now be explained. The seismic signals recorded from each of the seismic sensors 12 may be processed first by certain procedures well known in the art of seismic data processing, including the summing described above, and various forms of filtering. In some embodiments, the seismic sensors 12 may be arranged in directions substantially along a direction of propagation of acoustic energy that may be generated by the pumping unit 32, in the embodiment of FIG. 1 radially outward away from the wellhead 30. By such arrangement of the seismic sensors 12, acoustic noise from the pumping unit 32 and similar sources near the wellhead 30 may be attenuated in the detected seismic signals by, e.g., frequency-wavenumber (f k) filtering. Other processing techniques for noise reduction and/or signal enhancement will occur to those of ordinary skill in the art.

Figure 2:
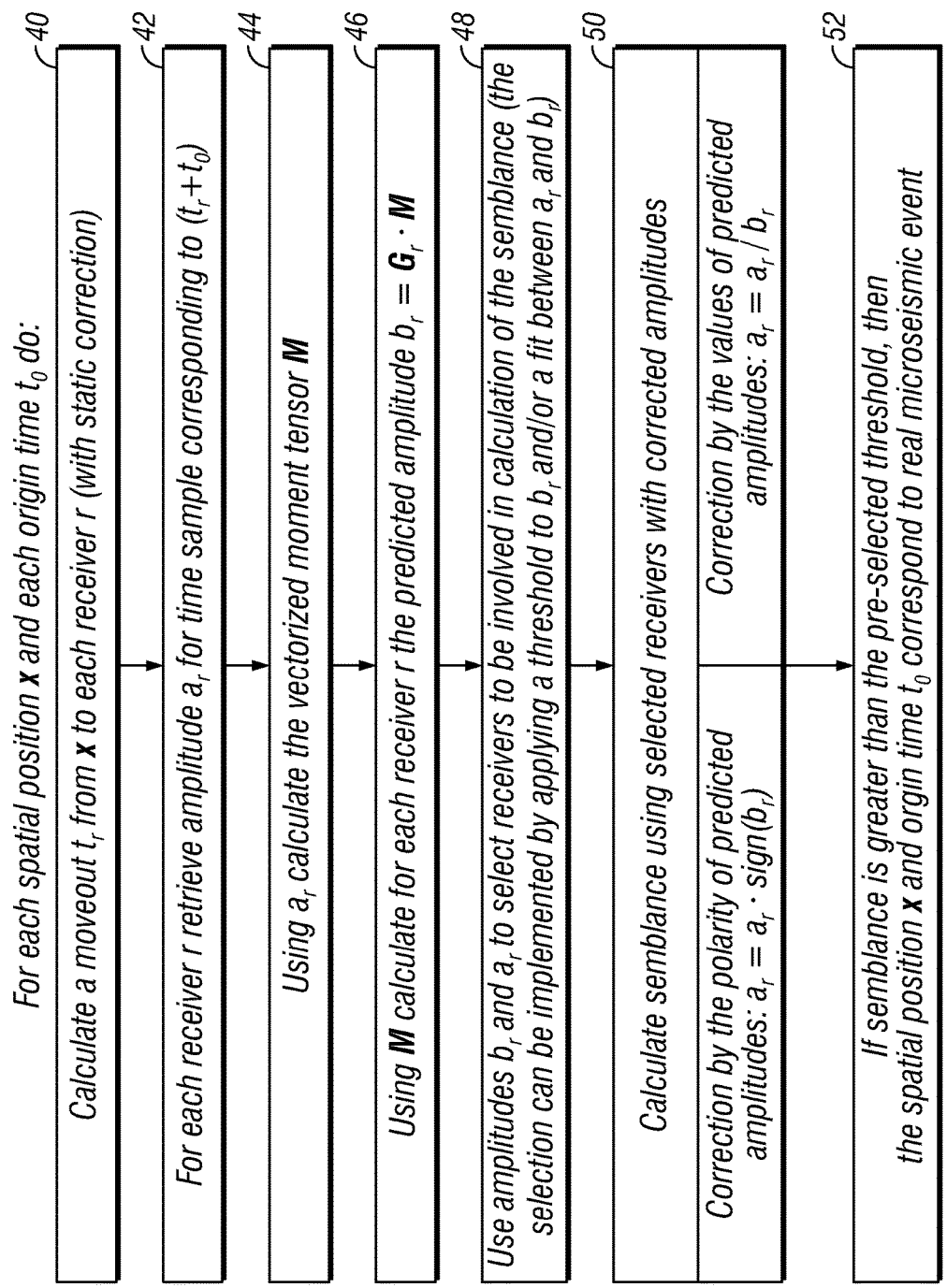
FIG. 2 shows a flow chart of an example processing technique according to the present disclosure.

Having acquired seismic signals in the manner explained above, an example processing technique according to the present disclosure will be explained with reference to FIG. 2. The process actions performed as explained below may be performed on a computer, on a computer system or any similar electronic system. A non-limiting example of a computer will be explained with reference to FIG. 3. If the computer or computer system is digital, it will be appreciated that the recorded seismic signals may be recorded in or digitized to convert their form to digital, wherein seismic signals are represented by number pairs corresponding to a measured signal amplitude at each of a plurality of signal times. The signal times may be generated as the product of a signal index number referenced to the start of recording and a time based digital sample rate. In implementing such process in a computer or computer system, signals detected and/or recorded from the seismic sensors as explained with reference to FIG. 1 may be communicate to the computer or computer system as input thereto. At 40, a moveout time, $t_r$, (i.e., a seismic energy travel time) from any considered (selected) position x in a subsurface volume or interest to the position of each seismic sensor r is calculated. The moveout time may be calculated using a seismic velocity model of the subsurface volume of interest, for example as may be obtained from surface reflection seismic surveys. Other sources for the subsurface velocity model may include wellbore seismic surveys either alone or in conjunction with surface reflection seismic surveys. At 42, the moveout time determined for each seismic sensor position r is added to a considered (preselected) microseismic event origin time $t_0$ following which an event signal amplitude $a_r$ is retrieved from the time sample in each seismic signal recording corresponding to the recorded signal time defined by $(t_r+t_0)$. The foregoing may be repeated for any or all of the remaining seismic signal recordings. At 44, the event signal amplitudes $a_r$ are used to obtain a vectorized moment tensor M, which may be determined using an expression such as one described in: Sipkin, S. A., 1982, *Estimation of earthquake source parameters by the inversion of waveform data: synthetic waveforms*, Physics of the Earth and Planetary Interiors, 30(23), 242-259, Special Issue Earthquake Algorithms, and Anikiev, D., Stanek, F., Valenta, J., and Eisner, L. (2013), *Imaging microseismic events by diffraction stacking with moment tensor inversion*, SEG Technical Program Expanded Abstracts 2013: pp. 2013-2018. doi: 10.1190/segam2013-0830.1. The moment tensors obtained at 44 are then used to determine, at 46, a predicted seismic event amplitude $b_r$ at each seismic sensor position r. The predicted seismic event amplitude may be determined by a scalar product of $G_r$ (the vectorized derivative of Green's function, described in Sipkin, 1982 and Anikiev et al., 2014) with M as in following expression:

$$b_r = G_r \cdot M \tag{1}$$

The predicted seismic event amplitudes and the event signal amplitudes $a_r$ determined at 42 may be used, at 48 to calculate a semblance for one or more selected seismic sensor traces. The semblance, at 50, may be calculated using amplitudes corrected by the polarity of the predicted seismic event amplitudes $b_r$ or with the event signal amplitudes corrected by values of predicted seismic event amplitudes. The semblance may be calculated in the form of a ratio of a squared sum of amplitudes from signals from all the seismic sensors and a sum of squared amplitudes divided by a number of the seismic sensors. Such calculation may be performed according to the following expression:

$$S(A) = \frac{\left(\sum_{i=1}^{N} A_i\right)^2}{N \cdot \sum_{i=1}^{N} A_i^2} \tag{2}$$

Semblance values range from 0 to 1. Semblance S of N event signal amplitudes $A_i$ reaches a maximum value of 1 when the set of event signal samples $A_i$ have a uniform distribution, i.e., all $A_i$ are equal. The minimum semblance value 0 is obtained for a set of amplitudes with zero average, for example, when A consists of random Gaussian noise. However this means that the semblance computed from amplitudes corresponding to sources with directionally dependent polarity and amplitude can never reach the maximum value of 1 because amplitudes of seismic energy radiating toward the seismic sensors are dependent on the actual seismic energy radiation pattern for each microseismic event, which as previously explained is related to the source mechanism. In the present example embodiment, a new application of semblance may be used where the samples $A_i$ are not raw amplitudes but amplitudes corrected for the seismic energy radiation pattern. To apply these criteria for detection of microseismic events from time-continuous seismic data one may use joint inversion of microseismic event location and its corresponding source mechanism, and correct both the amplitude polarity and magnitude before the semblance computation is performed. The latter may also be used during post-processing to verify whether the determined microseismic events correspond to true microseismic events.

One may then compare synthetically computed, uncorrected signal amplitudes and amplitudes with corrected polarities based on the source mechanism using the expression:

$$A_i = a_i \cdot \mathrm{sign}(b_i) \tag{3}$$

and amplitudes corrected in both polarity and size:

$$A_i = a_i \cdot \frac{1}{b_i} \tag{4}$$

where $a_i$ is an original amplitude and $b_i$ is a synthetic amplitude modeled for the $i^{th}$ seismic sensor resulting from the moment tensor M inverted from all amplitudes $a_i$ (i.e., set a).

At 52, if the calculated semblance is above a selected threshold, then the considered spatial position x and origin time $t_0$ (collectively a "hypocenter") are determined to correspond to an actual microseismic event, rather than a false positive indication of a microseismic event.

In other embodiments, signals from only those of the seismic sensors are selected by values of synthetic event amplitudes having a value above a selected threshold to determine origin time and spatial position of the microseismic event(s).

Figure 3:
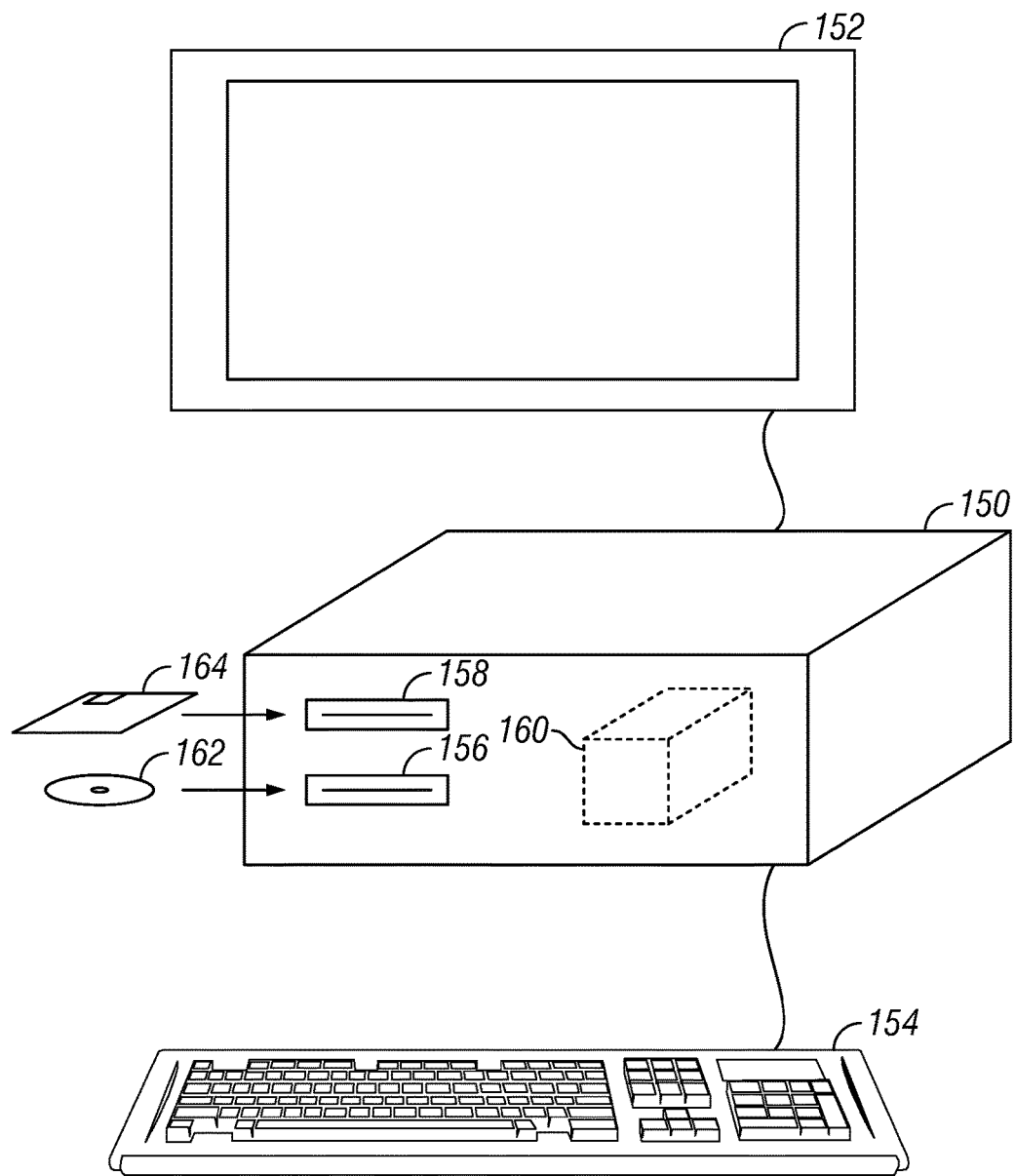
FIG. 3 shows an example programmable computer that may be used in some embodiments.

Referring to FIG. 3, the foregoing process as explained with reference to FIGS. 1 and 2 may be embodied in computer-readable code. The computer-readable code can be stored on a computer readable medium, such as solid state memory card 164, CD-ROM 162 or a magnetic (or other type) hard drive 166 forming part of a general purpose programmable computer. The computer, as known in the art, includes a central processing unit 150, a user input device such as a keyboard 154 and a user display 152 such as a flat panel LCD display or cathode ray tube display. According to this aspect of the invention, the computer readable medium includes logic operable to cause the computer to execute acts as set forth above and explained with respect to the previous figures. The computer, as explained above, may be in the recording unit (10 in FIG. 1) or may be any other computer located at any desired location.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining hypocenters of microseismic events, comprising:
   entering as input to a computer seismic signals detected by a plurality of seismic sensors disposed proximate a volume of subsurface to be evaluated;
   in the computer, for each point in space in the volume, for a selected seismic velocity model and for a plurality of preselected origin times, calculating an expected arrival time of seismic energy at each seismic sensor position;
   in the computer, determining event amplitudes for each arrival time from the detected seismic signals;
   in the computer, calculating a synthetic event amplitude for each arrival time;
   in the computer, calculating a semblance using the determined event amplitudes corrected using the synthetic event amplitudes;
   in the computer, determining existence of at least one actual microseismic event when the semblance exceeds a selected threshold; and
   displaying or recording a position and origin time of the at least one actual microseismic event.

2. The method of claim 1 wherein the semblance is calculated as a ratio between a squared sum of amplitudes from signals from all the seismic sensors and a sum of squared amplitudes divided by a number of the seismic sensors.

3. The method of claim 1 further comprising determining a plurality of hypocenters of microseismic events during pumping of an hydraulic fracturing fluid into a wellbore and generating a map of microseismic events caused by the hydraulic fracturing fluid over time.

4. The method of claim 1 wherein only a polarity of the determined event amplitudes is corrected by the synthetic event amplitudes.

5. The method of claim 1 wherein only a polarity of the determined event amplitudes is corrected by both a polarity and a size of the synthetic event amplitudes.

6. The method of claim 1 wherein signals from seismic sensors are selected by using values of the synthetic event amplitudes.

7. The method of claim 1 wherein the synthetic event amplitudes are determined by determining a scalar product of a vectorized derivative of Green's function with a seismic moment tensor determined from the determined event amplitudes.

8. The method of claim 7 wherein the seismic moment tensor is determined by inversion processing the event amplitudes.

9. The method of claim 1 wherein the seismic signals are generated by pumping a fluid into formations disposed in the volume to cause fracturing thereof.

10. The method of claim 9 wherein the seismic sensors are deployed in subgroups along a direction of radiation of acoustic noise generated by devices disposed at the Earth's surface.

11. The method of claim 1 wherein the seismic sensors are deployed proximate Earth's surface.

* * * * *